(12) United States Patent
Jonsson

(10) Patent No.: US 7,904,105 B2
(45) Date of Patent: Mar. 8, 2011

(54) METHOD AND ARRANGEMENT FOR ALLOCATING POWER IN A COMMUNICATION NETWORK

(75) Inventor: Anders Jonsson, Taby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 735 days.

(21) Appl. No.: 11/913,035

(22) PCT Filed: Apr. 29, 2005

(86) PCT No.: PCT/SE2005/000625
§ 371 (c)(1),
(2), (4) Date: Oct. 29, 2007

(87) PCT Pub. No.: WO2006/118491
PCT Pub. Date: Nov. 9, 2006

(65) Prior Publication Data
US 2008/0200201 A1    Aug. 21, 2008

(51) Int. Cl.
*H04Q 7/20*    (2006.01)

(52) U.S. Cl. ............ 455/522; 455/450; 455/67.11; 455/516

(58) Field of Classification Search ............ 455/522, 455/69, 452.2, 67.11, 63.1, 561, 127, 450, 455/516; 370/335, 342, 320, 428, 466; 714/749, 714/748, 750
See application file for complete search history.

(56) References Cited

U.S. PATENT DOCUMENTS

| | | | |
|---|---|---|---|
| 6,477,388 B1* | 11/2002 | Schmutz | 455/522 |
| 2003/0210660 A1* | 11/2003 | Wiberg et al. | 370/320 |
| 2004/0043783 A1* | 3/2004 | Anderson | 455/522 |
| 2004/0141482 A1* | 7/2004 | Zeira et al. | 370/335 |
| 2004/0160923 A1* | 8/2004 | Nobukiyo et al. | 370/335 |
| 2004/0223507 A1* | 11/2004 | Kuchibhotla et al. | 370/428 |
| 2005/0113106 A1* | 5/2005 | Duan et al. | 455/452.2 |
| 2005/0152308 A1 | 7/2005 | Seol | |
| 2006/0143444 A1* | 6/2006 | Malkamaki et al. | 713/160 |
| 2007/0168827 A1* | 7/2007 | Lohr et al. | 714/749 |
| 2008/0077837 A1* | 3/2008 | Lohr et al. | 714/748 |
| 2008/0133995 A1* | 6/2008 | Lohr et al. | 714/748 |
| 2008/0207251 A1* | 8/2008 | Anderson | 455/522 |
| 2008/0276148 A1* | 11/2008 | Lohr et al. | 714/750 |

FOREIGN PATENT DOCUMENTS

| | | |
|---|---|---|
| EP | 1162774 A1 | 12/2001 |
| EP | 1 626 511 | 2/2006 |
| WO | WO 03/096571 A1 | 11/2003 |

OTHER PUBLICATIONS

3GPP TS 25.214 V6.4.0 (Dec. 2004), 3rd Generation Partnership Project; Technical Specification Group Radio Access Network; Physical layer procedures (FDD) (Release 6) Section 6A, p. 38-46.
3GPP TS 25.306 V6.3.0 (Dec. 2004) 3rd Generation Partnership Project; Technical Specification Group Radio Access Network; UE Radio Access capabilities (Release 6).

* cited by examiner

*Primary Examiner* — Tan Trinh

(57) ABSTRACT

In a method of allocating power to a channel in a communication system a given transport block size is compared (S1) to a maximum allowed transport block size for the channel, and power is allocated (S3) to said channel based on at least the comparison to improve the user perceived throughput for the channel.

28 Claims, 6 Drawing Sheets

METHOD AND ARRANGEMENT FOR ALLOCATING POWER IN A COMMUNICATION NETWORK

TECHNICAL FIELD

The present invention relates to communication systems in general, specifically to methods and arrangements for allocating power in such systems.

BACKGROUND

The evolution of the mobile communication market brings demands for both larger system capacity and higher data rates. To boost the support for packet switched services the 3GPP has standardized so called High Speed Downlink Packet Access or HSDPA. HSDPA includes a number of features whose combination improves the network capacity, and increases the peak data rates or throughput for downlink packet traffic. The HSDPA concept relies on a transport channel, the High Speed Downlink Shared Channel (HS-DSCH), where a large amount of power and code resources are assigned to a single user at a certain Transmission Time Interval (TTI) in a time and/or code multiplex manner. Also, HSDPA uses Adaptive Modulation and Coding, fast Physical Layer Hybrid ARQ and fast packet scheduling. These features are tightly coupled and permit a per-TTI adaptation of the transmission parameters to the instantaneous variations of the radio channel quality.

According to the 3GPP standard for HSDPA [1], a user equipment (UE) shall report the perceived channel quality to UMTS Terrestrial Radio Access Network (UTRAN). This is reported by means of a Channel Quality Indicator (CQI) information element contained in the associated uplink signaling channel (HS-DPCCH). This is schematically illustrated in FIG. 1. The CQI value reported to the UE reflects the UE's capabilities to decode the user data sent on the HS-DSCH and is used by UTRAN for UE scheduling and transport block (TB) selection. The CQI-value specifies the transport block size, number of codes and a modulation from a set of reference ones that the UE is capable of supporting with a predetermined detection error. The standard mandates that the UE CQI report should target a Hybrid Automatic Repeat Request (HARQ) Block Error Rate (BLER) of 10%.

The 3GPP specification TS 25.306 [2] specifies the capabilities for HSDPA capable UE. All UE classes have a maximum TB size capability per HARQ Transmission Time Interval (TTI) specified. This means that the absolute data rate will be limited for the UE by the TTI interval and the maximum allowed TB block size. If the TB selection in UTRAN adheres to the target value of 10% BLER even for the highest TB selection, this will result in a peak throughput approximately 10% lower than the maximum theoretically possible. This is illustrated in FIG. 2.

There is a need for improved peak data rates without introducing unnecessary interference.

SUMMARY

A general object of the present invention is to enable improved power allocation in a telecommunication system.

A specific object of the present invention is to enable maximized peak data rates for systems utilizing HSDPA.

Another object of the present invention is to enable maximizing throughput whilst minimizing associated interference.

A specific object of the present invention is to enable a method for allocating power on the HS-DSCH.

Another specific object of the present invention enables differentiated power allocation for higher or highest transport format or block sizes for each user equipment class.

An object of the present invention is to enable higher peak data rates for user data in a HSDPA capable cell.

These and other objects are achieved in accordance with the attached claims.

Basically, the invention comprises methods and arrangements for comparing a given transport block size with a maximum allowed transport block size for a channel and allocating power to the channel based at least on that comparison.

Specifically, the invention comprises increasing the throughput for large HARQ TB sizes by lowering the BLER by means of a judicious increase of power on the HS-PDSCH under certain conditions for large TB selections. For small or medium sized TB sizes the HARQ BLER is maintained at a higher level in order to minimize the negative effects the increasing power will have on cell throughput and neighboring cell interference. This combination allows higher peak data rates while minimizing the resulting interference in the own and neighboring cells.

In order to attain the maximum possible throughput, it is suggested that the transmit power allocated to the HS-PDSCH is increased for large MAC-hs. TB sizes in order to attain a lower HARQ BLER than for smaller TB size selections.

Advantages of the present invention comprise:
Enables user perceived throughput to approach the maximum theoretical pole value, without unnecessary increase of the cell interference.
Improved throughput for high transport block sizes.
Enables selective power allocation based on transport block size.

BRIEF DESCRIPTION OF THE DRAWINGS

The invention, together with further objects and advantages thereof, may best be understood by making reference to the following description taken together with the accompanying drawings, in which.

ABBREVIATIONS

Figure 1:
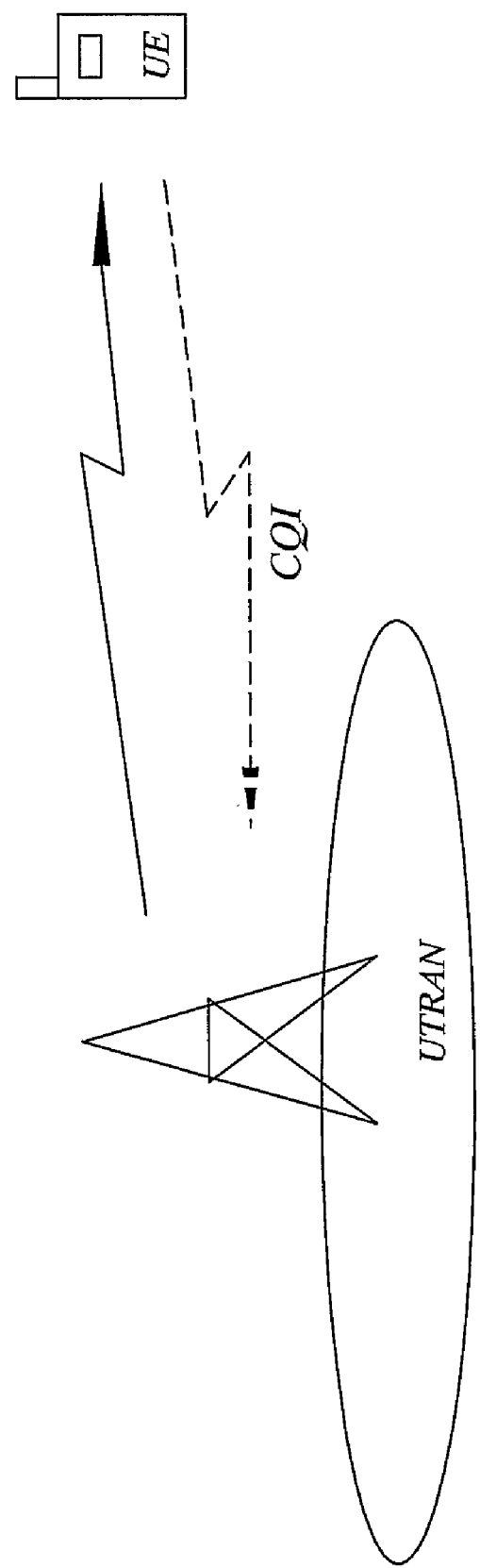
FIG. 1 is a schematic illustration of a system in which the invention can be implemented.

BLER Block Error Rate
CQI Channel Quality Indicator
HARQ Hybrid Automatic Repeat Request
HSDPA High Speed Downlink Packet Access
HS-DPCCH High Speed Downlink Physical Control Channel
HS-PDSCH High Speed Physical Downlink Shared Channel
HS-DSCH High Speed Downlink Shared Channel
TB Transport Block
TF Transport Format TTI Transmission Time Interval
UE User Equipment
UTRAN UMTS Terrestrial Radio Access Network

DETAILED DESCRIPTION

The present invention will be described in the context of a communication system utilizing High Speed Downlink Packet Access. However, the same general principles can be applied in other packet based systems where a specific power requirement provides an unnecessary limitation on maximum throughput. Consequently, the invention can be utilized in systems utilizing any one of WCDMA, CDMA2000, Enhanced UL, WLAN, HSDPA.

One of the disadvantages with prior art, as identified by the inventor, is that the system does not strive to achieve the highest possible user throughput. Instead, prior art systems are configured to attain a HARQ BLER of 10% for all transport block sizes. This generally results in a throughput that is 10% lower than theoretically possible. For some scenarios e.g. benchmarking or other, it is desirable to attain a maximized throughput at least for the highest transport block sizes. This must, however not be achieved by introducing unnecessary interference in the system.

Basically, according to the invention, if the user equipment (UE), such as a mobile phone, indicates very good channel conditions and the transport block size (TB) selection process in UTRAN selects the highest or one of the highest TB sizes possible for the UE to be scheduled, then the UTRAN allocates more power to the HS-PDSCH than would be the case for lower TB size selections. In this way retransmissions will be fewer and the throughput higher for the larger TB size selections. The throughput gain that can be achieved in this way is approximately 10%.

The reason to limit the allocation of higher power to the HS-PDSCH to the highest or the higher TB sizes only is that the interference level in the own and neighboring cells will increase and the overall throughput in the cell will decline if the HARQ BLER is decreased for other TB size selections as much as is suggested for the high TB size selections.

The general idea, according to the invention is thus to combine a good throughput on cell level by operating the cell on a higher HARQ BLER target for low to medium sized TB:s while using a lower HARQ BLER for the larger or largest TB selections. This will keep the interference level in the cell down while allowing a user to attain a higher maximum user data throughput than would be possible without this feature present in the system.

Another precondition for the use of higher output power on the HS-PDSCH is that there is a sufficient margin to the maximum possible power output of the Node B. In order to maintain system stability, the Node B capabilities in this area should be monitored and user as an input to the decision if a higher power setting on the HS-PDSCH is possible for the selected TB.

Figure 3:
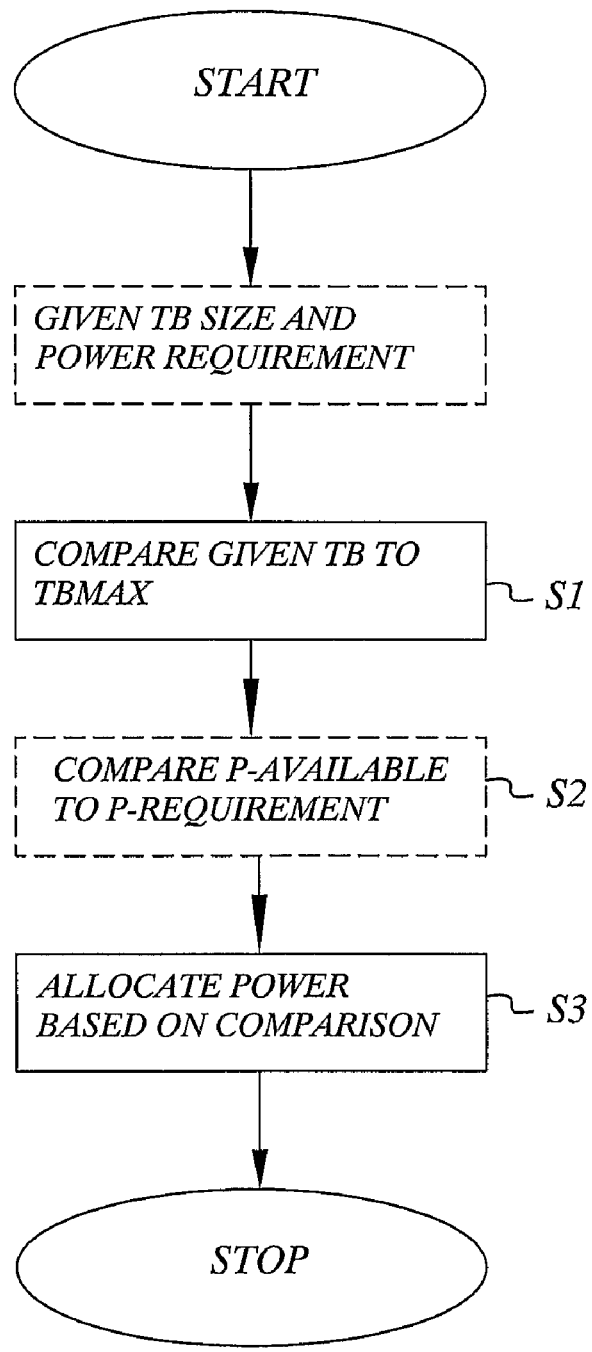
FIG. 3 is a schematic flow diagram of an embodiment of a method according to the invention.

With reference to FIG. 3, in a general embodiment of a method according to the present invention, for a given transport block (TB) size and a given power requirement ($P_{REQ}$), the given transport block size is initially compared S1 to a maximum allowed transport block size ($TB_{MAX}$) for the user equipment class. Subsequently, at least part of the available power is allocated S3 to the transport blocks based at least on that comparison.

A more specific embodiment comprises comparing S2 an available power to the given power requirement for the user equipment. Consequently, power is allocated to the given TB size S3 based on that comparison as well.

It is understood that the power which is allocated according to the invention is allocated in addition to the power allocated according to the given power requirement.

The comparison of the given TB size and the maximum allowed TB size can basically yield three different results, of which only two enable the invention to be executed. Firstly, the given TB size can be equal to the maximum allowed TB size. Secondly, the given TB size can be smaller than the maximum allowed TB size but larger than a predetermined TB limit size. Thirdly and finally, the given TB size can be smaller than the predetermined TB limit size. For the last case the invention will normally not be utilized since the throughput is small and the effect of maximizing the throughput for those TB sizes is limited.

In the following, a number of specific embodiments according to the invention will be described.

Figure 4:
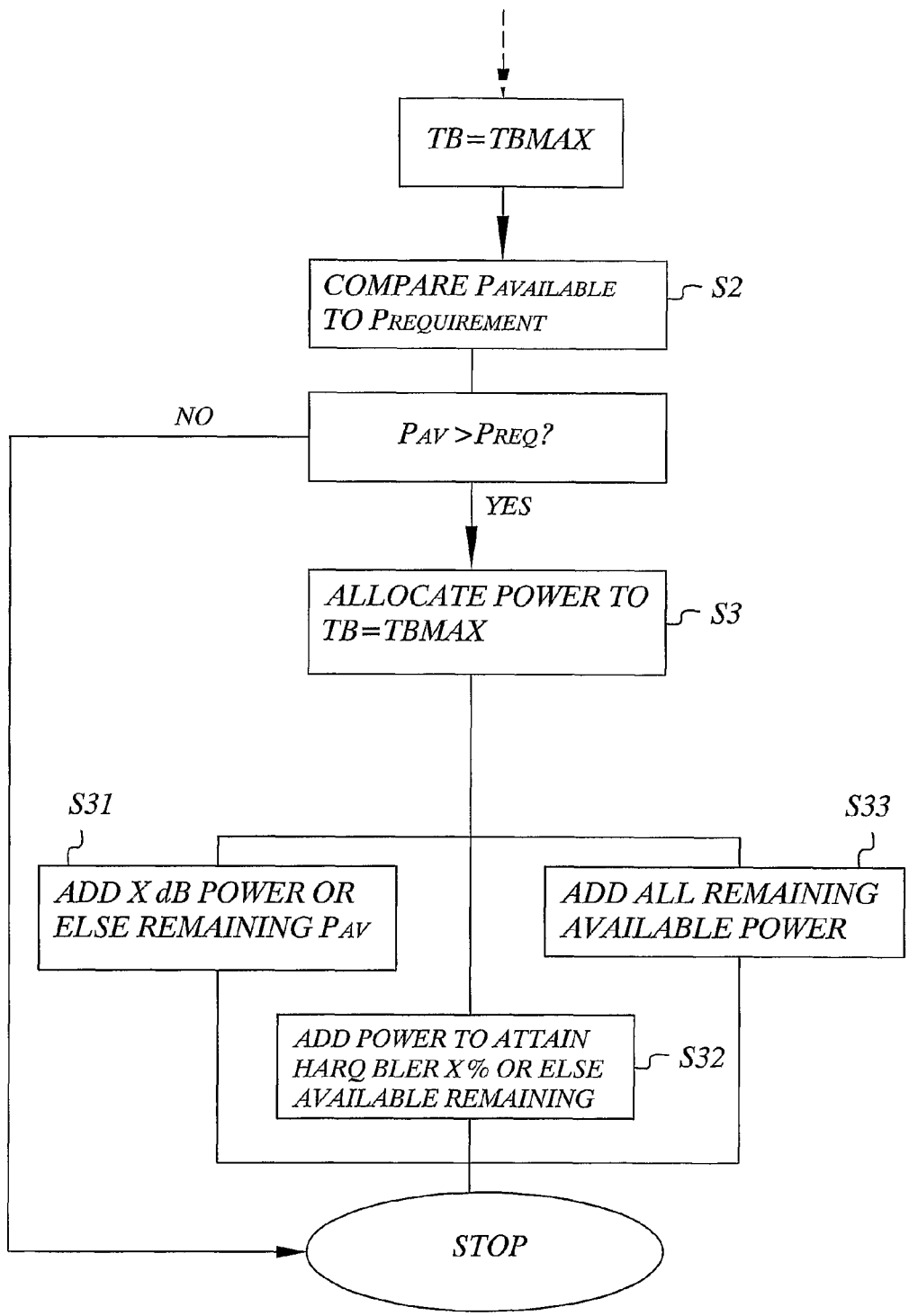
FIG. 4 is a schematic flow diagram of another embodiment of a method of the invention.

With reference to FIG. 4, according to a specific embodiment of the present invention, the comparison S1 of the given TB size and the maximum allowed TB size yields an equality, i.e. TB=TBmax. Subsequently, the given power requirement e.g. power needed to attain a predetermined HARQ BLER of e.g. 10%, is compared to the total available power for the channel of the UE S2. If the total available power is larger than the given power requirement, there is a remaining available power after power has been allocated to attain the HARQ BLER of e.g. 10%.

Figure 2:
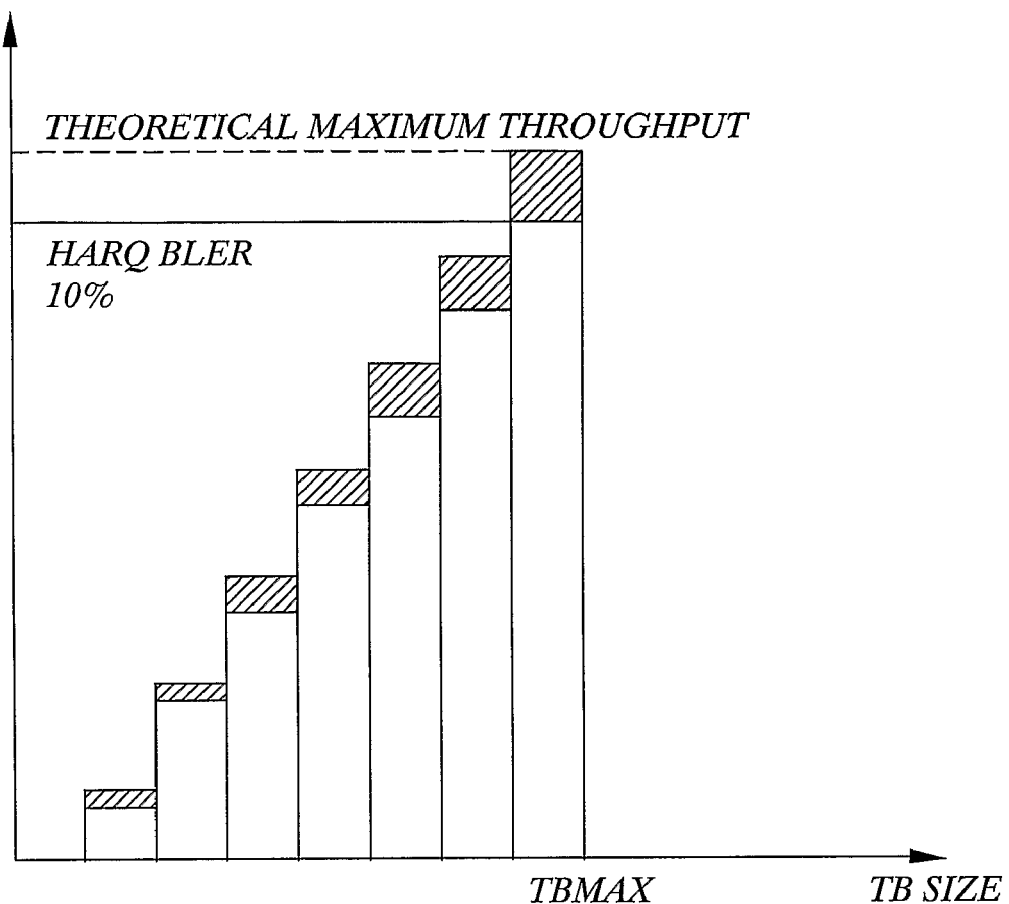
FIG. 2 is a diagram illustrating the impact of the invention.

According to a first alternative for power allocation to the maximum allowed TB size, a predetermined amount of power e.g. 3 dB is allocated S31 to the channel in addition to the already allocated power requirement, as illustrated by FIG. 2. However, this is only possible if the remaining available power is equal to or larger than that predetermined amount. If there is not enough remaining power, all remaining power is allocated to the maximum TB size. It is off course possible to implement some other allocation method if the remaining power is not enough to fulfill the predetermined power.

Also with reference to FIG. 4, according to a second alternative for power allocation to the maximum allowed TB size, power is allocated S32 to attain a predetermined HARQ BLER e.g. 1% that differs from the first power requirement i.e. 10%. Similarly as the first alternative, if not enough remaining power is available, then all remaining power is allocated or some other method is applied.

According to a third alternative, see FIG. 4, all remaining available power is allocated S33 to the maximum TB size.

Consequently, the throughput is maximized for the maximum transport block size, while all other TB sizes attain a HARQ BLER of 10%.

As an example of the benefit of the proposed scheme, a UE with a category class of 5 has the ability to receive data on 5 codes, with 16 QAM every TTI. The maximum number of bits of an HS-PDSCH transport block that the UE can receive within a TTI is 7298 bits.

Given the UE capabilities above, it is in this example assumed that UTRAN is able to send 27 blocks of 320 bits MAC-d PDU data every TTI.

This means the maximum possible throughput if no retransmissions occur will be:

$T_{pole}$=27×320×(1000/2)=4.32 Mbps

However, in this example we assume that UTRAN sets the power allocation on the 0 HS-PDSCH to target a BLER of 10%. This means that the throughput will be limited to:

$T_{10\% \, BLER}$=4.32×(1−(1−0.90))=3.89 Mbps

If on the other hand the power allocation on the HS-PDSCH is set to target a BLER of 1% the throughput will be:

$T_{1\% \, BLER}$=4.32×(1−(1−0.99))=4.28 Mbps

In this example for a UE with capability class 5 the BLER target was set at 1% for comparison but the throughput for the higher TB selections may be made to approach the pole throughput of 4.32 Mbps even closer if more power is allocated to the HS-PDSCH. Given the limitations set by power available and system stability, the chosen BLER will be a trade off between maximized throughput and the resulting interference to neighboring and own cells.

Figure 5:
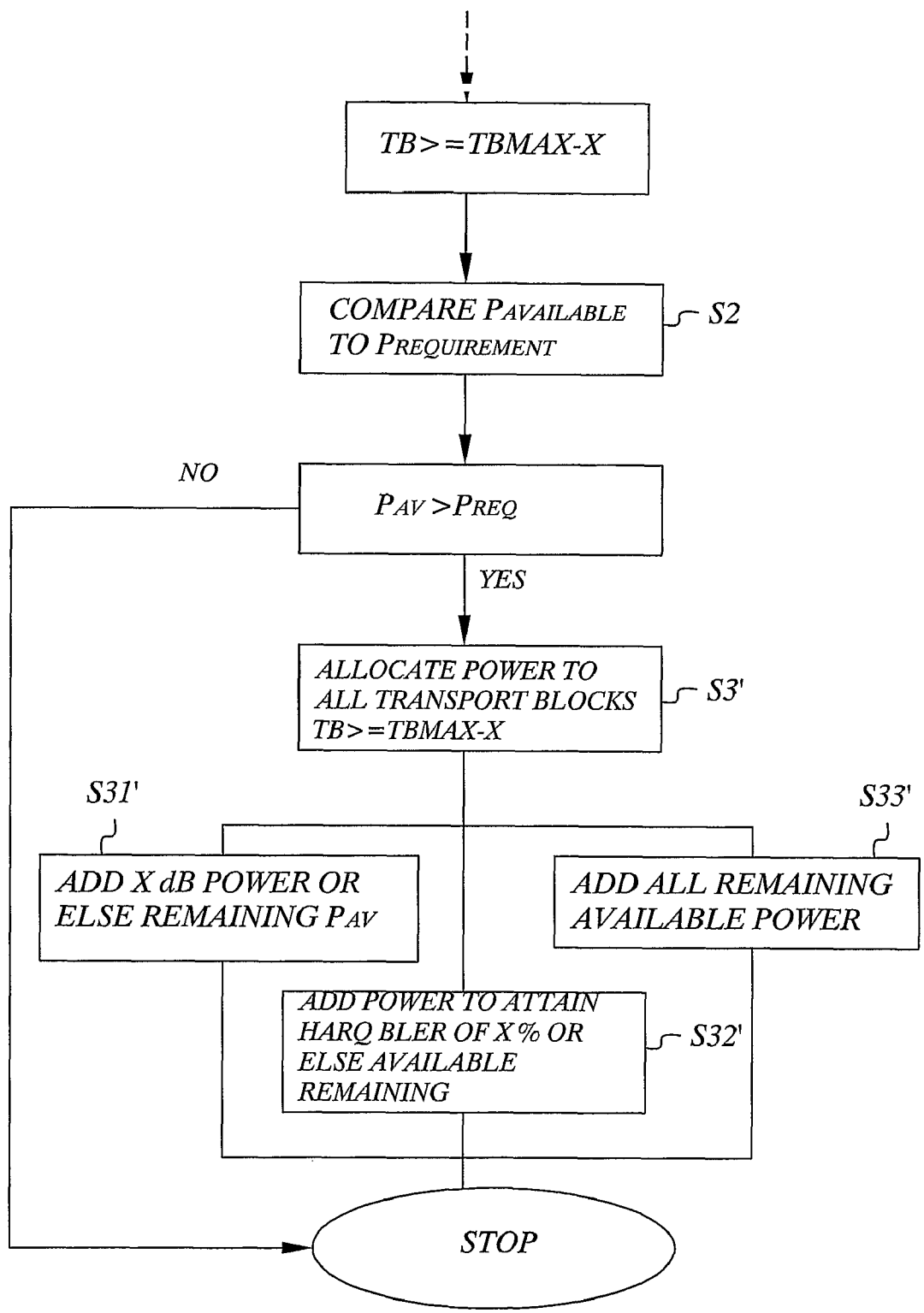
FIG. 5 is a schematic flow diagram of yet another embodiment of a method of the invention.

Another specific embodiment of a method according to the present invention will be described with reference to FIG. 5.

In this specific embodiment, the comparison of the given TB size and the maximum allowed TB size yields a plurality of TB sizes larger than a predetermined TB size limit. The limit is defined by the maximum transport block size minus a predetermined value. Subsequently, the total available power is compared to the given power requirement S2. If the total available power is larger than the given power requirement, as in the previous embodiment, at least part of the remaining available power is allocated S3' to each of all transport block sizes larger than or equal to the predetermined limit.

The remaining available power can be allocated S31', S32', S33' to the plurality of transport block sizes in the same way as the embodiment with the given TB size equal to the maximum TB size. In this embodiment, all of the plurality of transport block sizes are allocated the same amount of additional power. However, it is equally possible to differentiate the additional allocation if necessitated by interference considerations or other criteria.

Arrangements according to the invention will be described below, with reference to FIG. 6.

Figure 6:
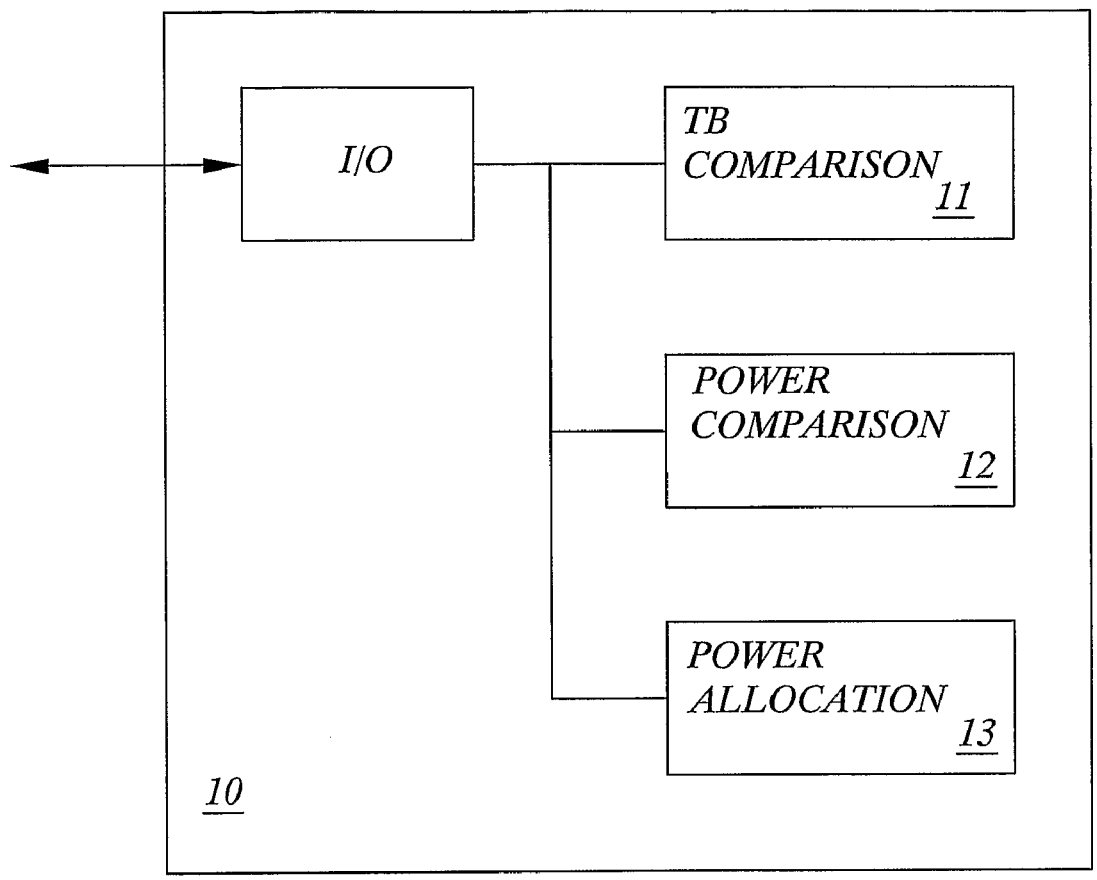
FIG. 6 is a schematic block diagram of an arrangement according the invention.

With reference to FIG. 6, an arrangement 10 in a communication system comprises an input/output unit I/O, a first comparing unit 11, which is configured to compare a given transport block size to a maximum allowed transport block size, and a power allocating unit 13 configured for allocating power to a channel based at least on the comparison.

The arrangement 10, according to a specific embodiment, comprises a second comparing unit 12 configured to compare a given power requirement with a total available power. In addition, the power allocating unit 13 is further adapted to allocate power based on that comparison as well.

According to a number of specific embodiments, the different units 11, 12, 13 of the arrangement 10 are further configured to execute the method of the invention as described above.

The power allocating unit 13 is adapted according to a first embodiment to allocate a predetermined amount of the remaining available power to the maximum allowable transport block size or a plurality of transport block sizes from a predetermined threshold size up to the maximum allowed transport size. If the remaining available power is not enough, then the allocating unit is adapted to allocate all remaining available power to the maximum transport block size or the plurality of sizes.

According to a second embodiment, the allocating unit 13 is adapted to allocate power to enable a predetermined HARQ BLER value that is lower than the given power requirement. If the remaining available power is not enough, then the allocating unit 13 is adapted to allocate all remaining power is allocated.

According to a third embodiment, the allocating unit 13 is adapted to allocate all remaining available power to the maximum transport block size or the plurality of transport block sizes.

It is implied that the arrangement can be located in a node of the system, preferably a Node B. However, it is also plausible that the functionality of the arrangement can be located in some other node or nodes.

A distinguishing characteristic and the main advantage with the proposed scheme is that it allows the throughput as perceived by the user to approach the maximum theoretical pole value while maintaining the interference generated by the cell much lower than would be possible if the power allocation was increased for all TF.

This means that the user perceived throughput will be approximately 10% higher if this feature is enabled compared to a conventional system. This is of particular importance in benchmarking scenarios where different WCDMA vendor solutions are compared.

It will be understood by those skilled in the art that various modifications and changes may be made to the present invention without departure from the scope thereof, which is defined by the appended claims.

REFERENCES

[1] 3GPP TS 25.214 V6.4.0 (2004-12), Section 6A, p 38-46.
[2] 3GPP TS 25.306 V6.3.0 (2004-12)

The invention claimed is:

1. Method of allocating power to a channel in a communication system, characterized by:
   comparing a given transport block size for the channel to a maximum allowed transport block size;
   allocating power to said channel based on at least the comparison to improve the throughput for the channel;
   comparing a given power requirement for the channel to a total available power;
   allocating power to said channel based at least on the power comparison;
   the second comparing step comprises determining the difference between the given power requirement and the total available power to calculate a remaining available power; and
   the allocating step comprising allocating at least part of the remaining available power for transport block sizes larger than or equal to a predetermined threshold value, where said predetermined threshold value is less than or equal to the maximum allowed transport block size for the channel.

2. The method according to claim 1, characterized in that if the given transport block size is equal to the maximum allowed transport block size. and the total available power is larger than the given power requirement, allocating at least part of the remaining available power for the maximum transport block size.

3. The method according to claim 2, characterized by allocating all said total available power for the maximum transport block size.

4. The method according to claim 2, characterized by allocating power for the maximum transport block size to enable a predetermined hybrid automatic retransmission block error rate which is less than that attained by the given power requirement or else allocating all available remaining power for the maximum transport block size.

5. The method according to claim 4, characterized in that said given power requirement enables a hybrid automatic retransmission block error rate of 10% and said predetermined hybrid automatic retransmission block error rate is 1%.

6. The method according to claim 1, characterized by allocating a predetermined amount of the remaining available power or all remaining available power for the maximum transport block size.

7. The method according to claim 6, characterized in that said predetermined amount is 3 dB.

8. The method according to claim 1, characterized by:
if said given transport block size is equal to or larger than the difference between the maximum allowed transport block size and a predetermined parameter value, and the total available power is larger than the given power requirement, allocating at least part of the available remaining power for all transport block sizes larger than or equal to said difference.

9. The method according to claim 8, characterized by allocating power for the plurality of transport block sizes by allocating a predetermined amount of power or all available remaining power for the plurality of transport block sizes, 10. The method according to claim 8, characterized by allocating all of the total available power for the plurality of transport block sizes.

11. The method according to claim 8, characterized by allocating power for the plurality of transport block sizes to enable a predetermined hybrid automatic retransmission block error rate which is less than that enabled by the given power requirement or else allocating all available remaining power for the plurality of transport block sizes.

12. The method according to claim 11, characterized in that said given power requirement enables a hybrid automatic retransmission block error rate of 10% and said predetermined hybrid automatic retransmission block error rate is 1%.

13. The method according to claim 1, characterized by said communication system utilizing one of WCDMA, CDMA2000, enhanced UL WLAN, HSDPA.

14. An arrangement in a communication system, characterized by:
means for comparing a given transport block size for a channel to a maximum allowed transport block size;
means for allocating power to said channel based at least on said comparison, to improve the throughput for the channel;
means for comparing a given power requirement to a total available power, and said power allocating means are adapted to allocate power based at least on said comparison;
said comparing means are adapted to determine the difference between the given power requirement and the total available power to calculate a remaining available power; and
said allocating means are adapted to allocate at least part of the remaining available power for transport block sizes larger than or equal to a predetermined threshold value, where said predetermined threshold value is less than or equal to the maximum allowed transport block size for the channel.

15. The arrangement according to claim 14, characterized in that if the given transport block size is equal to the maximum allowed transport block size, and the total available power is larger than the given power requirement, said allocating means are adapted to allocate at least part of the remaining available power for the maximum transport block size.

16. The arrangement according to claim 15, characterized in that said allocating means are adapted to allocate all said remaining available power for the maximum transport block size.

17. The arrangement according to claim 15, characterized in that said allocating means are adapted to allocate power for the maximum transport block size to enable a predetermined hybrid automatic retransmission block error rate which is less than that attained by the given power requirement or else allocate all available remaining power for the maximum transport block size.

18. The arrangement according to claim 17, characterized in that said given power requirement enables a hybrid automatic retransmission block error rate of 10% and said predetermined hybrid automatic retransmission block error rate is 1%.

19. The arrangement according to claim 14, characterized in that said allocating means are adapted to allocate a predetermined amount of the remaining available power or all remaining available power for the maximum transport block size.

20. The arrangement according to claim 19, characterized in that said predetermined amount is 3 dB.

21. The arrangement according to claim 14, characterized by:
if said given transport block size is equal to or larger than the difference between the maximum allowed transport block size and a predetermined parameter value, and the total available power is larger than the given power requirement, said allocating means are adapted to allocate at least part of the available remaining power for all transport block sizes larger than or equal to said difference.

22. The arrangement according to claim 21, characterized in that said allocating means are adapted to allocate a predetermined amount of power or all available remaining power for each of the plurality of transport block sizes.

23. The arrangement according to claim 21, characterized in that said allocating means are adapted to allocate all of the available remaining power for each of the plurality of transport block sizes.

24. The arrangement according to claim 21, characterized in that said allocating means are adapted to allocate power for the plurality of transport block sizes to enable a predetermined hybrid automatic retransmission block error rate which is less than that enabled by the given power requirement or else allocate all available remaining power for each of the plurality of transport block sizes, 25. The arrangement according to claim 24, characterized in that said given power requirement enables a hybrid automatic retransmission block error rate of 10% and said predetermined hybrid automatic retransmission block error rate is 1%.

26. The arrangement according to claim 14, characterized by said communication system utilizing one of WCDMA, CDMA2000, enhanced UL, WLAN, HSDPA.

27. The node in a communication system, characterized by said node comprising an arrangement according to claim 14.

28. The node according to claim 27, characterized in that said node is a Node B.

* * * * *